US012691923B2

(12) United States Patent
Lin

(10) Patent No.: US 12,691,923 B2
(45) Date of Patent: Jul. 28, 2026

(54) STROLLER WITH DETACHABLE AUXILIARY POWER STRUCTURE

(71) Applicant: New Century Products Co., Ltd., Taipei City (TW)

(72) Inventor: Fu-Tsun Lin, Taipei City (TW)

(73) Assignee: New Century Products Co., Ltd., Taipei City (TW)

( * ) Notice: Subject to any disclaimer, the term of this patent is extended or adjusted under 35 U.S.C. 154(b) by 291 days.

(21) Appl. No.: 18/636,286

(22) Filed: Apr. 16, 2024

(65) Prior Publication Data

US 2024/0253685 A1 Aug. 1, 2024

Related U.S. Application Data

(63) Continuation-in-part of application No. 17/956,811, filed on Sep. 29, 2022, now abandoned.

(51) Int. Cl.
*B62B 7/08* (2006.01)
*B62B 5/00* (2006.01)
*B62B 5/04* (2006.01)
*B62B 7/04* (2006.01)
*B62B 9/08* (2006.01)

(52) U.S. Cl.
CPC .............. *B62B 7/08* (2013.01); *B62B 5/0043* (2013.01); *B62B 5/0069* (2013.01); *B62B 5/048* (2013.01); *B62B 7/042* (2013.01); *B62B 9/08* (2013.01)

(58) Field of Classification Search
CPC .............. B62B 7/08; B62B 7/042; B62B 7/06
See application file for complete search history.

(56) References Cited

U.S. PATENT DOCUMENTS

| | | | | |
|---|---|---|---|---|
| 5,873,425 A | * | 2/1999 | Yang | B62B 9/00 |
| | | | | 180/65.6 |
| 5,915,723 A | * | 6/1999 | Austin | B62B 3/02 |
| | | | | 280/47.35 |
| 6,148,942 A | * | 11/2000 | Mackert, Sr. | B62B 9/08 |
| | | | | 192/17 R |
| 6,360,836 B1 | * | 3/2002 | Milano, Jr. | B62B 5/0046 |
| | | | | 280/47.38 |

(Continued)

FOREIGN PATENT DOCUMENTS

| | | | | | |
|---|---|---|---|---|---|
| CN | 111688788 A | * | 9/2020 | | B62B 7/044 |
| DE | 102007004704 A1 | * | 8/2008 | | B62B 9/28 |

(Continued)

*Primary Examiner* — Steve Clemmons
(74) *Attorney, Agent, or Firm* — HDLS IPR SERVICES; Chun-Ming Shih

(57) ABSTRACT

Disclosed is a stroller with detachable auxiliary power structure, which includes a stroller body, a power control module, and a battery unit. The stroller body includes a front wheel member, a rear wheel member, a left folding member, and a right folding member. Front ends and rear ends of the right and left folding frames are pivotally connected to the front wheel member and the rear wheel member, respectively. The power control module is mounted to a bottom of the rear wheel member and includes a drive motor that outputs a rotational speed and a torque, a gear box, and a power output shaft that has one end connected to the gear box and an opposite end connected to the rear right wheel or the rear left wheel. The battery unit is connected to the drive motor to serve as a power source.

11 Claims, 6 Drawing Sheets

(56)         References Cited

U.S. PATENT DOCUMENTS

| | | | | |
|---|---|---|---|---|
| 7,987,933 B1 * | 8/2011 | McClellan | ................ | B62B 9/00 |
| | | | | 280/647 |
| 8,033,348 B1 * | 10/2011 | Parkhe | .................... | B62B 9/085 |
| | | | | 180/19.1 |
| 9,027,689 B1 * | 5/2015 | Brien | ........................ | B62B 9/22 |
| | | | | 280/47.38 |
| 9,211,903 B2 * | 12/2015 | Lee | ........................ | B62B 5/0414 |
| 9,669,858 B2 * | 6/2017 | Washington | ............ | B62B 9/005 |
| 9,738,300 B2 * | 8/2017 | Georgiev | .................. | B62B 9/00 |
| 9,796,401 B1 * | 10/2017 | Ammirati | .............. | B62B 5/005 |
| 10,464,588 B1 * | 11/2019 | Lin | ........................... | B62B 7/08 |
| 10,576,971 B2 * | 3/2020 | Takeda | ................ | B60L 15/2009 |
| 10,953,905 B2 * | 3/2021 | Tse | ........................... | B62B 5/005 |
| 11,124,216 B1 * | 9/2021 | Wein | ........................ | B62B 9/08 |
| 11,465,664 B1 * | 10/2022 | Choi | ....................... | B62B 3/025 |
| 2017/0259838 A1 * | 9/2017 | Choi | ....................... | B62B 3/007 |
| 2021/0309275 A1 * | 10/2021 | Lee | ........................... | B62B 9/14 |

FOREIGN PATENT DOCUMENTS

| | | | | | | |
|---|---|---|---|---|---|---|
| DE | 102013216679 A1 | * | 2/2015 | ............. | B62B 9/00 |
| GB | 2579891 A | * | 7/2020 | ............. | B62B 3/025 |
| GB | 2590925 A | * | 7/2021 | ............. | B62B 5/005 |
| JP | 2017012546 A | * | 1/2017 | ......... | B62B 5/0069 |
| TW | 201710132 A | * | 3/2017 | ............. | B62B 7/06 |
| WO | WO-2013041666 A1 | * | 3/2013 | ............. | A61G 5/04 |
| WO | WO-2023031211 A1 | * | 3/2023 | ........... | B62B 5/0033 |

* cited by examiner

STROLLER WITH DETACHABLE AUXILIARY POWER STRUCTURE

CROSS REFERENCE TO RELATED APPLICATIONS

This is a continuation-in-part of co-pending U.S. patent application Ser. No. 17/956,811 filed on Sep. 29, 2022.

BACKGROUND OF THE INVENTION

(a) Technical Field of the Invention

The present invention relates to a stroller, and more particularly to a stroller with a detachable auxiliary power structure.

(b) Description of the Prior Art

Families with infants and young children usually have a stroller for infants and young children to sit and lie in the stroller, so that the burden of adults for holding or carrying the infants or young children can be reduced, and the infants and young children can also sit or lie in the stroller safely and comfortably. At present, there are many types of baby strollers available in the market. With regard to the frame structure of the strollers, there are various folding types for consumers to choose. As to equipment, the lightest baby stroller only has a seat, and the more luxurious baby strollers are equipped with a handrail, sunshade covers, dinner plates or baskets, and the likes. However, a disadvantage of the above-mentioned strollers is that these strollers do not have power, and they must be pushed and pulled by manpower to make the strollers move forward or backward.

Furthermore, a baby stroller that is pushed by manpower causes a physical burden on the parents when the baby stroller is pushed upslope or for a long distance. Therefore, an electrically-driven baby stroller is launched on the market, and the electrically-driven baby stroller is driven by a motor and allows for manually adjusting the speed by means of for example buttons.

Further, a known power wheel that is commonly adopted in an electrically-driven stroller includes a structure that is an integrated combination of a motor, a stroller wheel rim, and a tire. In actual uses, the tire is easily worn out due to friction and abrasion, yet it is not feasible for such a known power wheel to replace the tire alone and the integrated combination of the motor, the stroller wheel rim and the tire is necessarily changed simultaneously. This causes an increase of the cost for replacing the consumable parts of the strollers.

In order to solve the problems mentioned above, the present invention aims to provide a stroller having a detachable auxiliary power structure.

SUMMARY OF THE INVENTION

In view of the above, the primary objective of the present invention is to provide a stroller with detachable auxiliary power structure, which comprises a power control module and a battery unit arranged in combination with a stroller body, wherein the power control module comprises a drive motor, a deceleration mechanism, and a power output shaft, so that humanist control and optimal safe use is achieved by adjusting the driving motor and the deceleration mechanism. In addition, the stroller with the detachable auxiliary power structure according to the present invention can be used for a plurality of infants, children or pets, so that the stroller can be used in many aspects.

To achieve the above objective, the present invention provides a stroller with detachable auxiliary power structure, which comprises: a stroller body, at least one power control module, and a battery unit, wherein the stroller body comprises a rear wheel member, a rear wheel member, and a folding member. The front wheel member comprises a front wheel frame, and a front right wheel and a front left wheel mounted to a bottom of the front wheel frame. The rear wheel member comprises a rear wheel frame, and a rear right wheel and a rear left wheel mounted to a bottom of the rear wheel frame. A handrail is connected to the rear wheel frame, and the handrail is arranged to extend toward a rear side of the rear wheel frame. The folding member comprises a right folding frame and a left folding frame. Front ends of the right folding frame and the left folding frame are pivotally connected to the front wheel member. Rear ends of the right folding frame and the left folding frame are pivotally connected to the rear wheel member. The at least one power control module is mounted to a bottom of the rear wheel frame. The at least one power control module comprises: a drive motor, a deceleration mechanism, a drive controller, and two drum brakes, wherein the drive motor outputs a rotational speed and a torque; the deceleration mechanism is connected with the drive motor, such that the rotational speed and the torque outputted from the drive motor are changeable by the deceleration mechanism; the drive controller is connected with the drive motor; and the two drum brakes are respectively arranged on a tire of the rear right wheel and a tire of the rear left wheel and are rotating at a same speed as the tires, each of the drum brakes comprising a brake drum and a brake shoe, such that during braking, the brake shoe that is circular is expanded outward to respectively rub against an inner surface of the brake drum that rotates with the tire to force the brake drum and the tire to slow down until the rotation is stopped Further, the battery unit is connected to the drive motor to serve as a power source. The at least one power control module further comprises two universal coupling members, and the two universal coupling members are connected to two support frames. The two support frames are respectively mounted to the rear right wheel and the rear left wheel. The two universal coupling members are connected to the rear wheel frame. A wheel-motor separation/combination module is arranged on one of the rear right wheel and the rear left wheel. The wheel-motor separation/combination module comprises: a motor component, which is electrically connected with the battery unit, and comprises an outer flange; a motor cover, which comprises an inwardly recessed trough and is fit, by means of the inwardly recessed trough, to an outside surface of the motor component. The motor cover comprises a plurality of projecting rims, and a plurality of fastener elements extend through the projecting rims and the outer flange of the motor component to securely combine and fix the motor cover and the motor component together. The outside surface of the motor cover comprises a plurality of guide rails. A rubber ring is arranged between the motor cover and the motor component at a fitting site thereof. One of the rear right wheel and the rear left wheel comprises an outer frame and an outer tire. The outer frame and the outer tire are integrally formed to combine together. The outer frame comprises an inside fitting surface, and the inside fitting surface comprises a plurality of guide grooves respectively corresponding to and mating with the guide rails. The outer frame is fit to the outside surface of the motor cover to have the guide grooves and the guide rails joined together. A plurality of fastener elements penetrate through the outer frame and extend into the projecting rims of the motor cover to have the outer frame and the motor cover fixedly combined together.

The stroller according to the present invention further comprises a power output shaft, wherein the power output shaft has one end connected with a gear box and an opposite end connected with one of the rear right wheel and the rear left wheel, and the power output shaft is rotatable by means of the gear box to cause the one of the rear right wheel and the rear left wheel to operate.

The stroller according to the present invention further comprises a differential, wherein the differential is connected to the power output shaft and the gear box, and the differential is operable to control the rotational speed outputted by the drive motor.

In the stroller according to the present invention, each of the right folding frame and the left folding frame comprises an upper front cross rod, a lower front cross rod, an upper rear cross rod, a lower rear cross rod, and a support frame, the support frame comprising an upper folding frame member, a lower folding frame member, and a central vertical rod connected between the upper folding frame member and the lower folding frame member, wherein a rear end of the upper front cross rod and a front end of the upper rear cross rod are pivotally connected to two ends of the upper folding frame member, respectively, and a rear end of the lower front cross rod and a front end of the lower rear cross rod are pivotally connected to two ends of the lower folding frame member, respectively, and front ends of the upper front cross rod and the lower front cross rod are pivotally connected to the front wheel frame, and rear ends of the upper rear cross rod and the lower rear cross rod are pivotally connected to the rear wheel frame; and a front connecting rod is connected between the lower front cross rods of the right folding frame and the left folding frame, and a rear connecting rod is connected between the lower rear cross rods of the right folding frame and the left folding frame.

In the stroller according to the present invention, the handrail comprises a base mounted thereon, and the base comprises at least one start button, a left turn button, a right turn button, and a control module, the at least one start button being disposed on a front side of the base, the left turn button and the right turn button being disposed on a side opposite to the at least one start button, the control module being disposed on an upper side of the base, a circuit board being embedded in the base, the circuit board being electrically connected with the drive controller and the battery unit. Further, the control module comprises a power button, a slow start acceleration button, a slow speed reduction button, a reversing button, and the slow start acceleration button, the slow speed reduction button, and the reversing button are operable to control the drive motor to drive the stroller for forward movement, backward movement, and turning; and the control module comprises a touch screen or a display screen.

The stroller according to the present invention further comprises a plurality of sensing elements, wherein the sensing elements are mounted on the rear wheel member, and the sensing elements are electrically connected with the drive controller and the battery unit; and the sensing elements comprise a weight sensing element, a temperature sensing element, a velocity sensing element, and an inertial measurement unit.

In the stroller according to the present invention, the at least one power control module comprises a left power control module and a right power control module, wherein the left power control module comprises a left drive motor, a left deceleration mechanism, and a left drive controller, one end of the left drive motor being connected with the left deceleration mechanism, another end of the left drive motor being connected with the left drive controller, the left deceleration mechanism being operable to drive the rear left wheel to operate; and the right power control module comprises a right drive motor, a right deceleration mechanism, and a right drive controller, one end of the right drive motor being connected with the right deceleration mechanism, another end of the right drive motor being connected with the right drive controller, the right deceleration mechanism being operable to drive the rear right wheel to operate.

In the stroller according to the present invention, the at least one power control module further comprises two universal coupling members, and the two universal coupling members are connected to two support frames, the two support frames being respectively mounted to the rear right wheel and the rear left wheel, the two universal coupling members being connected to the rear wheel frame.

In the stroller according to the present invention, the rear right wheel comprises a right inner frame, a right outer frame, and a right outer tire structure, and the rear left wheel comprises a left inner frame, a left outer frame, and a left outer tire structure, the right outer tire structure being combined with the right outer frame, the left outer tire structure being combined with the left outer frame, each of the right outer tire structure and the left outer tire structure comprising at least one tire unit, which is removable from the right outer frame or the left outer frame.

In the stroller according to the present invention, one of the guide grooves and one of the guide rails corresponding to and mating with the one of the guide grooves define mating configurations that are different from mating configurations of remaining ones of the guide grooves and ones of the guide rails corresponding to and mating with the remaining ones of the guide grooves to constrain the outer frame and the outer tire to mount to the motor cover in a specific direction.

In the stroller according to the present invention, a material of the outer frame comprises a nylon plastic material and a material of the outer tire comprises a polyurethane (PU) material.

BRIEF DESCRIPTION OF THE DRAWINGS

The above and other objects, features, and other advantages of the present invention will be more clearly understood from the following detailed description taken in conjunction with the accompanying drawings, in which.

DETAILED DESCRIPTION OF THE PREFERRED EMBODIMENTS

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices may be schematically shown in order to simplify the drawings.

Figure 1:
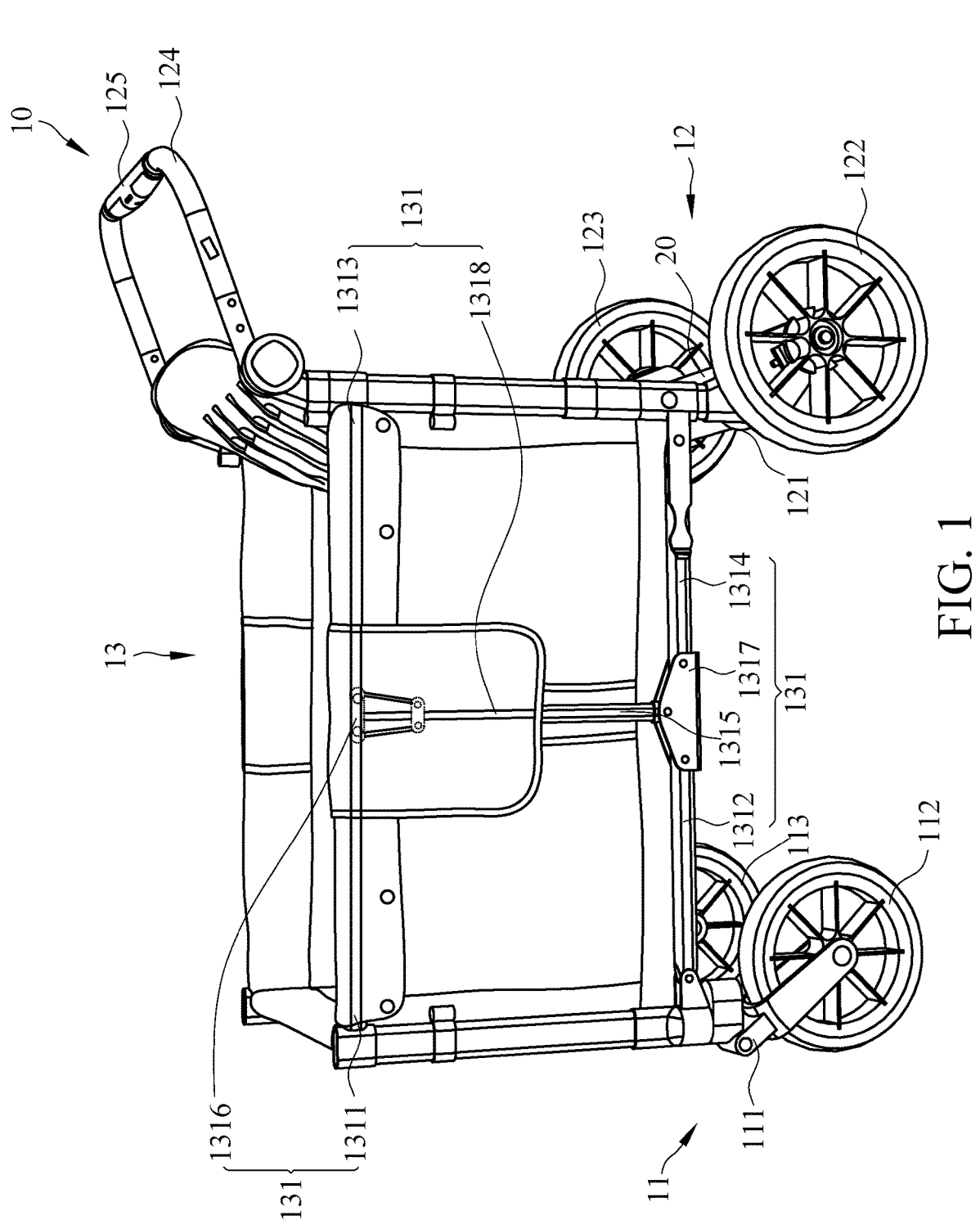
FIG. 1 is a schematic view showing a stroller with a detachable auxiliary power structure according to the present invention.
Figure 2:
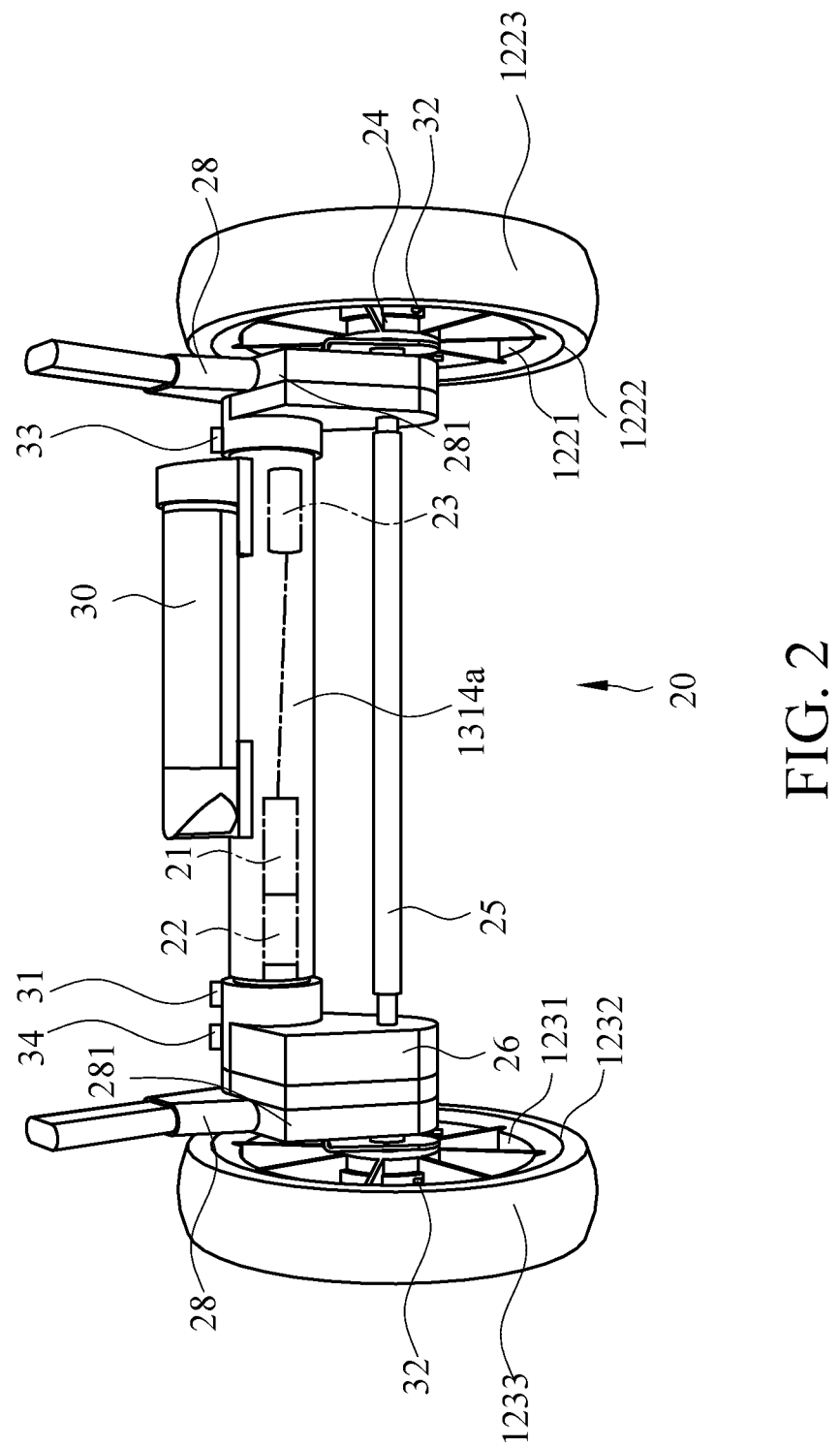
FIG. 2 is a schematic view showing a power control module of the stroller according to a first embodiment of the present invention.

Referring to FIGS. 1 and 2, FIG. 1 is a schematic view showing a stroller with a detachable auxiliary power structure according to the present invention; and FIG. 2 is a schematic view showing a power control module of the stroller according to the present invention.

As shown in FIGS. 1 and 2, the present invention provides a stroller with a detachable auxiliary power structure, generally designate at 1, which comprises a stroller body 10, at least one power control module 20, and a battery unit 30. The stroller body 10 comprises, between a right side and a left side, a front wheel member 11, a rear wheel member 12, and a folding member 13. The front wheel member 11 comprises a front wheel frame 111 and a front right wheel 112 and a front left wheel 113 mounted to a bottom of the front wheel frame 111. The rear wheel member 12 comprises a rear wheel frame 121 and a rear right wheel 122 and a rear left wheel 123 mounted to a bottom of the rear wheel frame 121. A handrail 124 is connected to the rear wheel frame 121, and the handrail 124 is arranged to extend toward a rear side of the rear wheel frame 121. The folding member 13 comprises a right folding frame 131 and a left folding frame (not shown), respectively at the right side and the left side and have similar structures, so that the description for the right folding frame 13 is generally applicable to the left folding frame, while repeated description for the left folding frame will be omitted. Front ends of the right folding frame 131 and the left folding frame are pivotally connected to the front wheel member 11, and rear ends of the right folding frame 131 and the left folding frame are pivotally connected to the rear wheel member 12. Further, the right folding frame 13 (and also the left folding frame not visible in the drawings) comprises an upper front cross rod 1311, a lower front cross rod 1312, an upper rear cross rod 1313, a lower rear cross rod 1314, and a support frame 1315. The support frame 1315 comprises an upper folding frame member 1316, a lower folding frame member 1317, and a central vertical rod 1318 connected between the upper folding frame member 1316 and the lower folding frame member 1317. A rear end of the upper front cross rod 1311 and a front end of the upper rear cross rod 1313 are pivotally connected to two ends of the upper folding frame member 1316, respectively, and a rear end of the lower front cross rod 1312 and a front end of the lower rear cross rod 1314 are pivotally connected to two ends of the lower folding frame member 1317, respectively. Front ends of the upper front cross rod 1311 and the lower front cross rod 1312 are pivotally connected to the front wheel frame 111, and rear ends of the upper rear cross rod 1313 and the lower rear cross rod 1314 are pivotally connected to the rear wheel frame 121. In addition, a front connecting rod (not shown) is connected to and arranged between the lower front cross rod 1312 of the right folding frame 13 and that of the left folding frame, and a rear connecting rod 1314a is connected to and arranged between the lower rear cross rod 1314 of the right folding frame 13 and that of the left folding frame.

As shown in FIGS. 1 and 2, the at least one power control module 20 is mounted to a bottom of the rear wheel frame 121. The at least one power control module 20 comprises a drive motor 21, a deceleration mechanism 22, a drive controller 23, two drum brakes 24, a power output shaft 25, a gear box 26, and a battery unit 30. The drive motor 21 is operable to output a rotational speed and also to output a torque. The deceleration mechanism 22 is connected with the drive motor 21, and the deceleration mechanism 22 functions to change the rotational speed and the torque outputted from the drive motor 21. The drive controller 23 is connected with the drive motor 21. The drive motor 21 is arranged at a position that is variable as desired by a user, and the drive motor 21 can be arranged, for example, in an interior of the rear right wheel 122 or an interior of the rear left wheel 123, or alternatively, the drive motor 21 can be arranged inside of the rear connecting rod 1314a or outside of the rear connecting rod 1314a, but the present invention is not limited thereto. Further, a type of the drive motor 21 can be changed as desired by the user, and the drive motor 21 can be for example a hub motor, a brushed DC motor, or a tubular motor, but the present invention is not limited thereto, and the present invention can be embodied with any motors that are available in the market. The two drum brakes 24 are respectively arranged on a tire of the rear right wheel 122 and a tire of the rear left wheel 123 and rotate at the same speed as the tires. Each of the drum brakes 24 comprises a brake drum and a brake shoe. During braking, the brake shoe, which is circular, is expanded outward to rub against an inner surface of the brake drum that is in rotation with the tire, so as to force the brake drum and the tire to slow down until the rotation thereof is stopped. Further, the power output shaft 25 has one end connected with the gear box 26 and an opposite end connected with the rear right wheel 122 or the rear left wheel 123. The power output shaft 25 is driven to rotate through the gear box 26 so as to cause the rear right wheel 122 or the rear left wheel 123 to operate. Further, the battery unit 30 is connected to the drive controller 23 to serve as a power source. In a preferred example, the drive motor 21 is a 50 W DC brushless motor; the deceleration mechanism 22 is a 45 reduction ratio mechanism, and the rotational speed is about 3.2 Km/Hr. Further, the battery unit 30 is connected with the drive motor 21 to serve as a power source therefor. Further, the at least one power control module 20 further comprises two universal coupling members 28. The two universal coupling members 28 are connected to two support frames 281, respectively. The two support frames 281 fixedly mounted to the rear right wheel 122 and the rear left wheel 123, respectively. The two universal coupling members 28 are connected to the rear wheel frame 121. The two universal coupling members 28 are connectable with various types of strollers.

Further, the rear right wheel 122 includes a right inner frame 1221, a right outer frame 1222, and a right outer tire structure 1223. The rear left wheel 123 includes a left inner frame 1231, a left outer frame 1232, and a left outer tire structure 1233. The right outer tire structure 1223 is combined with the right outer frame 1222. The left outer tire structure 1233 is combined with the left outer frame 1232. The right outer tire structure 1223 and the left outer tire structure 1233 are each formed of at least one tire unit, and the at least one tire unit is removable from the right outer frame 1222 or the left outer frame 1232. A material, a tread pattern, and a structure of the at least one tire unit can be varied as desired by the user, and various types of tires can be replaced according to various terrains, but the present invention is not limited thereto.

Figure 3:
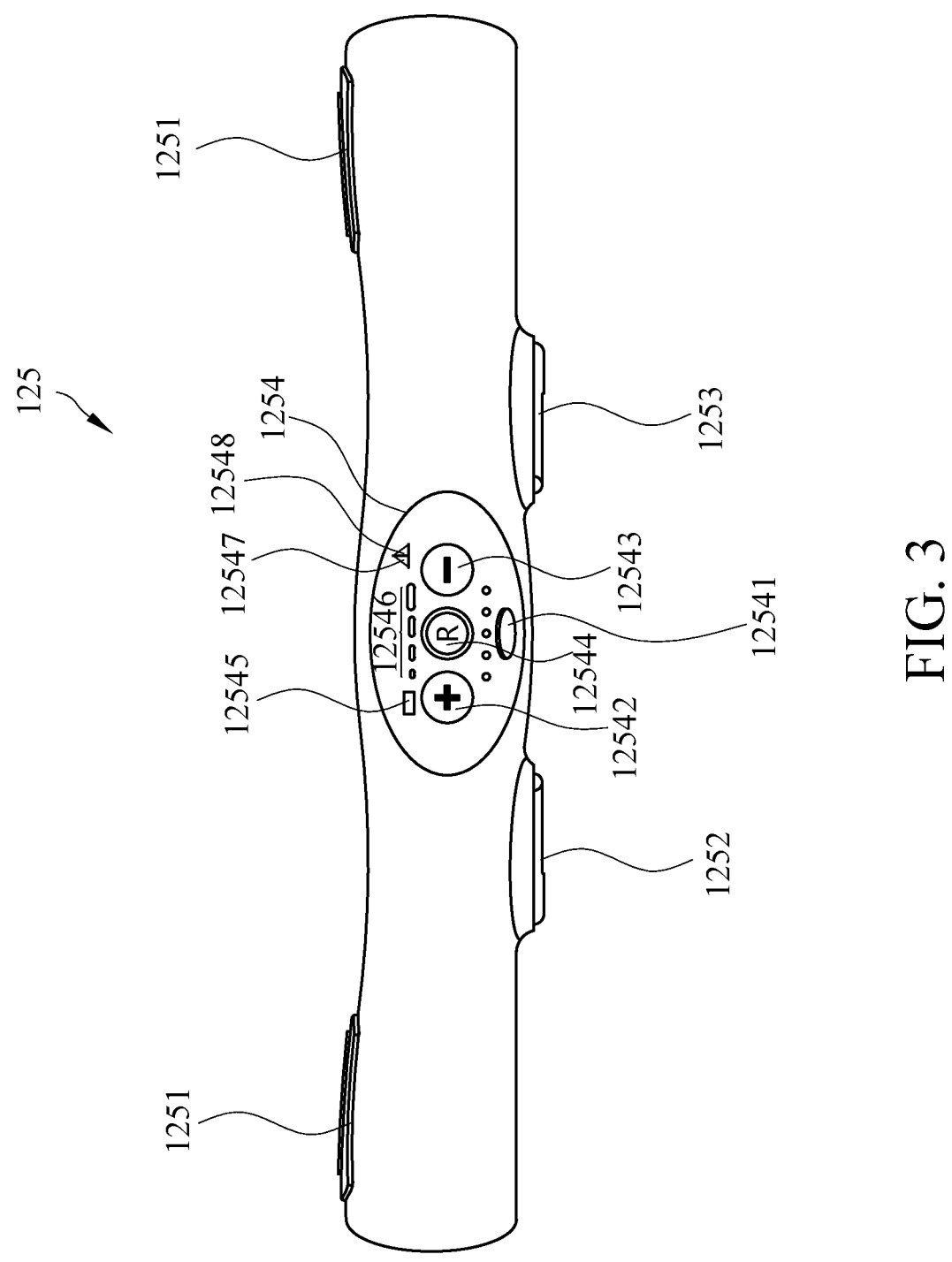
FIG. 3 is a schematic view showing a handrail of the stroller according to the present invention.

As shown in FIGS. 2 and 3, the handrail 124 comprises a base 125 mounted thereon. The base 125 comprises at least one start button 1251, a left turn button 1252, a right turn button 1253, and a control module 1254. The at least one start button 1251 is disposed on a front side of the base 125. The left turn button 1252 and the right turn button 1253 are disposed on a side opposite to the at least one start button 1251. The control module 1254 is disposed on an upper side of the base 125. A circuit board (not shown) is embedded in the base 125, and the circuit board is electrically connected with the drive controller 23 and the battery unit 30. Further, the control module 1254 includes a power button 12541, a slow start acceleration button 12542, a slow speed reduction button 12543, and a reversing button 12544. The left turn button 1252, the right turn button 1253, the slow start acceleration button 12542, the slow speed reduction button 12543, and the reversing button 12544 are operable to control a rotation direction of the drive motor 21 to drive the stroller for forward movement, backward movement, and turning. The control module 1254 can be for example a touch screen or a display screen. Further, styles and positions of all the above-mentioned buttons are variable as desired by the user, and the drawings are provided only for illustration, and the present invention is not limited thereto.

As shown in FIGS. 2 and 3, the stroller 1 further comprises a plurality of sensing elements. The sensing elements are mounted on the rear wheel member 12, and the sensing elements are electrically connected with the control module 1254 and the battery unit 30. The sensing elements include a weight sensing element 31, a velocity sensing element 32, an inertial measurement unit 33, and a temperature sensing element 34. The weight sensing element 31 is arranged on the rear wheel frame 121, and the weight sensing element 31 can be for example a leveling instrument or a gyroscope to obtain a load value 12545 of the stroller 1 and the load value is transmitted to the control module 1254. The velocity sensing element 32 is arranged on the rear right wheel 122 and the rear left wheel 123, and the velocity sensing element 32 detects a wheel speed value 12456 of the rear right wheel 122 and the rear left wheel 123 and transmits the wheel speed value to the control module 1254. The wheel speed value 12456 can be divided into for example 4 statuses. The inertial measurement unit 33 is arranged on the rear wheel frame 121, and the inertial measurement unit 33 is formed of a three-axis gyroscope and a three-direction accelerometer and functions to detect an angle of inclination, which is displayable on the control module 1254 as an uphill mode 12547 or a downhill mode 12548. The temperature sensing element 34 is arranged on the rear wheel frame 121, and the temperature sensing element 34 functions to detect a motor temperature, which is compared with a preset value to determine whether to generate a warning signal or not, and to display the warning signal on the control module 1254.

Figure 4:
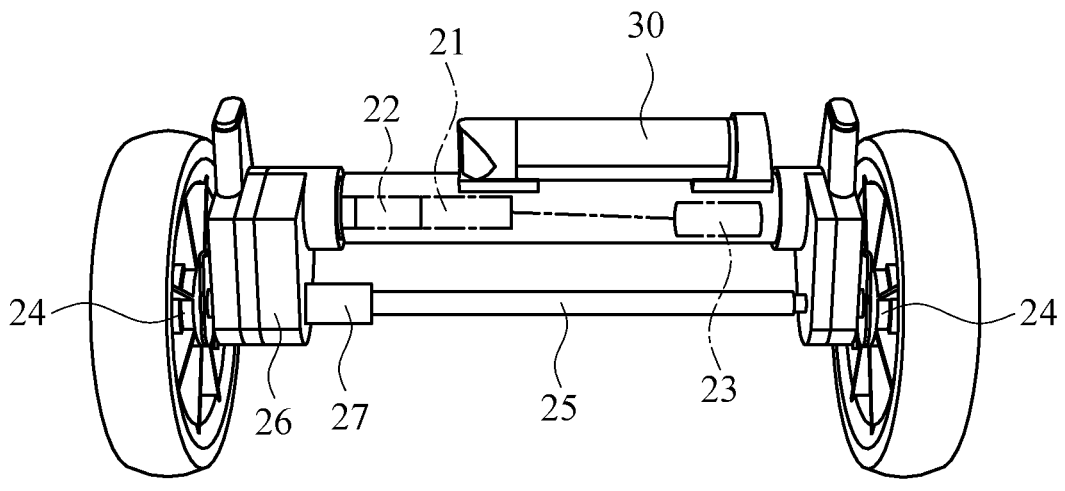
FIG. 4 is a schematic view showing a power control module of the stroller according to a second embodiment of the present invention.

Referring to FIG. 4, FIG. 4 is a schematic view showing a power control module of the stroller according to a second embodiment of the present invention.

As shown in FIG. 4, the stroller 1 further comprises a differential 27. The differential 27 is connected to the drive motor 21 and the power output shaft 25, and the differential 27 functions to control a rotational speed outputted by the drive motor 21. In an example, the drive motor 21 is a DC brushless motor; the deceleration mechanism 22 is a 45 reduction ratio mechanism; and the power control module 20 serves as an auxiliary power kit for the stroller 1.

Figure 5:
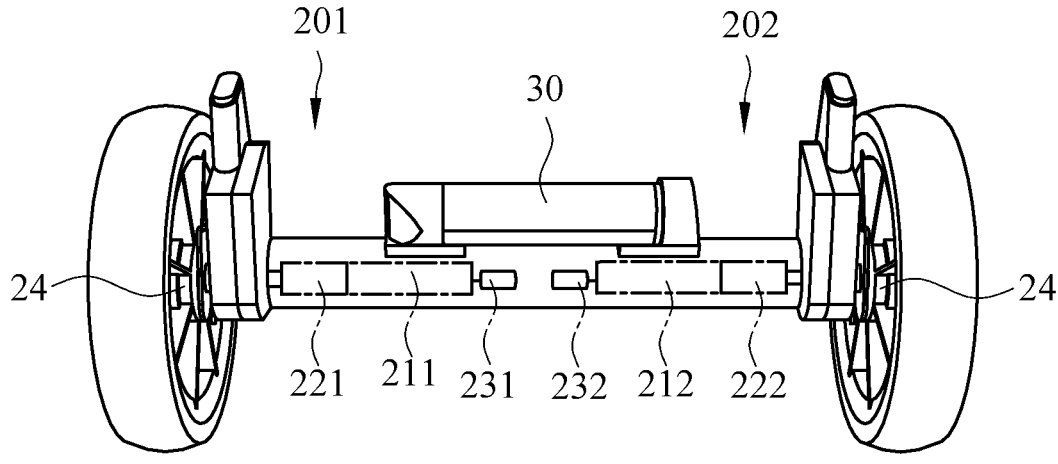
FIG. 5 is a schematic view showing a power control module of the stroller according to a third embodiment of the present invention.

Referring to FIG. 5, FIG. 5 is a schematic view showing a power control module according to a third embodiment of the present invention.

As shown in FIG. 5, the stroller 1 comprises a left power control module 201 and a right power control module 202. The left power control module 201 comprises a left drive motor 211, a left deceleration mechanism 221, and a left drive controller 231. One end of the left drive motor 211 is connected with the left deceleration mechanism 221, and another end of the left drive motor 211 is connected with the drive controller 231; the left deceleration mechanism 221 functions to drive the rear left wheel 123 to operate. The right power control module 202 comprises a right drive motor 212, a right deceleration mechanism 222, and a right drive controller 232. One end of the right drive motor 212 is connected with the right deceleration mechanism 222, and another end of the right drive motor 212 is connected with the drive controller 232; the right deceleration mechanism 222 functions to drive the rear right wheel 122 to operate. In an example, the left drive motor 211 and the right drive motor 212 are each a DC brushless motor; the left deceleration mechanism 221 and the right deceleration mechanism 222 are each a 60 reduction ratio mechanism; and the left power control module 201 and the right power control module 202 each serve as an auxiliary power kit for the stroller 1.

The stroller with a detachable auxiliary power structure according to the present invention automatically detects and switches to the best operating mode in various driving conditions. For example, when the stroller moves on a flat surface, the rotation direction and intensity of the stroller can be detected and the driving speed can be adjusted automatically; and when the stroller moves uphill, it can detect the gradient and automatically switch to the "uphill mode" and can easily climb up the slope with the assistance of the drive motor; and when the stroller moves downhill, it can detect the gradient and automatically switch to the "downhill mode" and applies automatic braking to make the stroller travel slowly and safely; and when the stroller moves on a slope, it can detect the inclination angle and automatically switch to the "one-side anti-flow mode", which can support the stroller to travel, so that the stroller can go straight.

Figure 6:
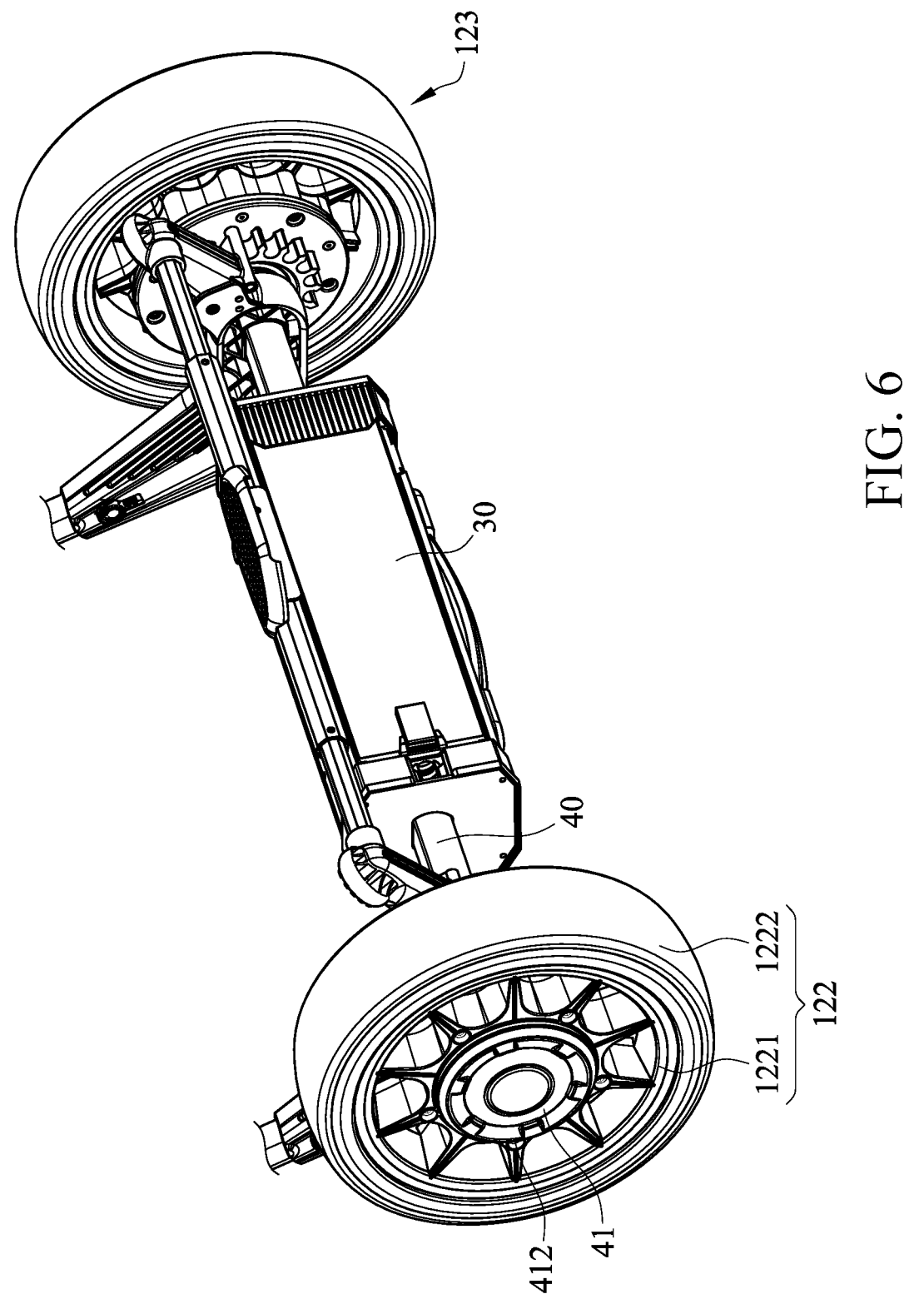
FIG. 6 is a schematic view showing a wheel-motor separation/combination module according to a fourth embodiment of the present invention.
Figure 7:
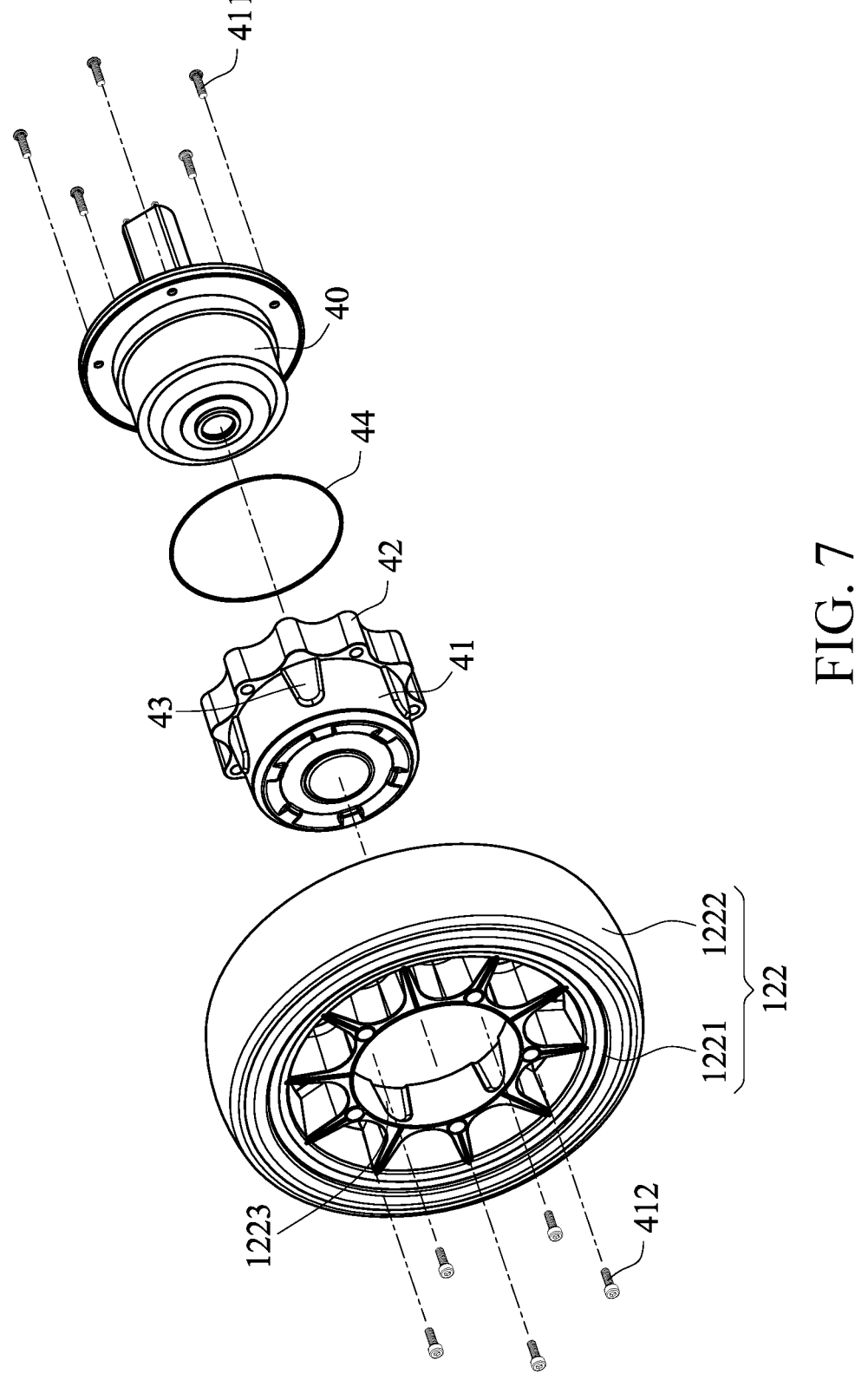
FIG. 7 is an exploded view showing the wheel-motor separation/combination module according to the fourth embodiment of the present invention.

Referring to FIGS. 6 and 7, FIG. 6 is a schematic view showing a wheel-motor separation/combination module according to a fourth embodiment of the present invention; and FIG. 7 is an exploded view showing the wheel-motor separation/combination module according to the fourth embodiment of the present invention.

As shown in FIGS. 6 and 7, a wheel-motor separation/combination module is arranged on one of the rear right wheel 122 and the rear left wheel 123. The wheel-motor separation/combination module comprises: a motor component 40 and a motor cover 41. In the instant embodiment, the description will be made with reference to the rear right wheel 122, which is taken as an example for description.

The motor component 40 is electrically connected with the battery unit 30 and includes an outer flange.

The motor cover 41 includes an inwardly recessed trough and is fit, by means of the inwardly recessed trough, over and mounted to an outside surface of the motor component 40. The motor cover 41 includes a plurality of projecting rims 42, and a plurality of fastener elements 411, such as screw fasteners, are applied to extend through the projecting rims 42 and the outer flange of the motor component 40 to have the motor cover 41 fixedly combined with the motor component 40. A plurality of guide rails 43 are formed on an outside surface of the motor cover 41. A rubber ring 44 is arranged between the motor cover 41 and the motor component 40.

One of the rear right wheel 122 and the rear left wheel 123, for example the rear right wheel 122 in this case, includes an outer frame 1221 and an outer tire 1222, and the outer frame 1221 and the outer tire 1222 are combined together as being integrally formed together. The outer frame 1221 includes an inside fitting surface, and the inside fitting surface includes a plurality of guide grooves 1223 respectively corresponding to and mating with the guide rails 43. The outer frame 1221 is fit over and mounted to the outside surface of the motor cover 41, and the guide grooves 1223 and the guide rails 43 are joined together by mutually guiding each other. A plurality of fastener elements 412, such as screw fasteners, are arranged to penetrate through the outer frame 1221 and respectively extend into the projecting rims 42 of the motor cover 41 to have the outer frame 1221 and the motor cover 41 fixedly combined together.

Further, the guide grooves 1223 and the guide rails 43 are respectively paired together as multiple groups, among which a specific group is arranged to provide the guide groove 123 and the guide rail 43 of the specific group with mating configurations that are different from mating configurations of the guide grooves 1223 and the guide rails 43 of the remaining ones of the multiple groups, for purposes of constraining the outer frame 1221 and the outer tire 1222 to be only mounted to the motor cover 41 in a given direction defined by the specific group.

A material of the outer frame 1221 is selected as a nylon plastic material, and a material of the outer tire 1222 is selected as a polyurethane (PU) material.

In this way, the wheel-motor separation/combination module may divide power transmission into two parts, and the motor component 40 and the motor cover 41 are combined together and the outer tire 1222 and the outer frame 1221 are combined together.

To assemble the wheel-motor separation/combination module, the motor cover 41 and the motor component 40 are first fastened and fixed together, and then, the outer tire 1222 and the outer frame 1221 that are combined together are fastened and fixed to the motor cover 41.

The guide grooves 1223 and the guide rails 43 that are respectively provided on the outer frame 1221 and the motor component 40 and are configured for guiding each other during assembling improve the combination and fixing power between the outer frame 1221 and the motor cover 41, while help ease operations of assembling and disassembling.

According to the present invention, the wheel-motor separation/combination module includes at least the following advantages:

(1) The motor and the tire are arranged as two separate parts, and in case that the tire is worn out and must be replaced, the tire can be replaced alone and is not necessarily replaced together with the motor, so as to reduce the cost for the user to replace the consumable parts.

(2) Different tires can be used to handle different road surfaces and environments, such as sandy road, a macadam road, and a snow surface.

(3) The rubber ring 44 is arranged between the motor cover 41 and the motor component 40 at the location where they are joined together for the purposes of offering better watertightness, and as such, mounting and removing the tire do not affect the waterproofness of the motor.

(4) The outer frame 1221 and the outer tire 1222 are optionally allowed to mount to the motor cover 41 in any direction or are constrained for mounting only in a specific, predetermined direction.

The foregoing description, for the purpose of explanation, was made with reference to specific embodiments; however, the embodiments were chosen and described in order to best explain the principles of the disclosure and its practical applications, to thereby enable those skilled in the art to best utilize the disclosure and various embodiments with various modifications as are suited to the particular use contemplated. The embodiments depicted above and the appended drawings are exemplary and are not intended to be exhaustive or to limit the scope of the disclosure to the precise forms disclosed. Modifications and variations are possible in view of the above demonstrations.

I claim:

1. A stroller, comprising:

a stroller body, which comprises:

a front wheel member, which comprises a front wheel frame, and a front right wheel and a front left wheel mounted to a bottom of the front wheel frame, a rear wheel member, which comprises a rear wheel frame, and a rear right wheel and a rear left wheel mounted to a bottom of the rear wheel frame, wherein a handrail is connected to the rear wheel frame, and the handrail is arranged to extend toward a rear side of the rear wheel frame, and a folding member, which comprises a right folding frame and a left folding frame, front ends of the right folding frame and the left folding frame being pivotally connected to the front wheel member, rear ends of the right folding frame and the left folding frame being pivotally connected to the rear wheel member;

at least one power control module, which is mounted to a bottom of the rear wheel frame and comprises:

a drive motor, which outputs a rotational speed and a torque, a deceleration mechanism, which is connected with the drive motor, such that the rotational speed and the torque outputted from the drive motor are changeable by the deceleration mechanism, a drive controller, which is connected with the drive motor, and two drum brakes, which are respectively arranged on a tire of the rear right wheel and a tire of the rear left wheel and are rotating at a same speed as the tires, each of the drum brakes comprising a brake drum and a brake shoe, such that during braking, the brake shoe that is circular is expanded outward to respectively rub against an inner surface of the brake drum that rotates with the tire to force the brake drum and the tire to slow down until the rotation is stopped; and a battery unit, which is connected to the drive controller to serve as a power source;

wherein the at least one power control module further comprises two universal coupling members, and the two universal coupling members are connected to two support frames, the two support frames being respectively mounted to the rear right wheel and the rear left wheel, the two universal coupling members being connected to the rear wheel frame; and wherein a wheel-motor separation/combination module is arranged on one of the rear right wheel and the rear left wheel, the wheel-motor separation/combination module comprising:

a motor component, which is electrically connected with the battery unit and comprises an outer flange, and a motor cover, which comprises an inwardly recessed trough and is fit, by means of the inwardly recessed trough, to an outside surface of the motor component, the motor cover comprising a plurality of projecting rims, a plurality of fastener elements extending through the projecting rims and the outer flange of the motor component to securely combine and fix the motor cover and the motor component together, the outside surface of the motor cover comprising a plurality of guide rails, a rubber ring being arranged between the motor cover and the motor component at a fitting site thereof; and one of the rear right wheel and the rear left wheel comprises an outer frame and an outer tire, the outer frame and the outer tire being integrally formed to combine together, the outer frame comprising an inside fitting surface, the inside fitting surface comprising a plurality of guide grooves respectively corresponding to and mating with the guide rails, the outer frame being fit to the outside surface of the motor cover to have the guide grooves and the guide rails joined together, a plurality of fastener elements penetrating through the outer frame and reaching into the projecting rims of the motor cover to have the outer frame and the motor cover fixedly combined together.

2. The stroller according to claim 1, further comprising a power output shaft, wherein the power output shaft has one end connected with a gear box and an opposite end connected with one of the rear right wheel and the rear left wheel, and the power output shaft is rotatable by means of the gear box to cause the one of the rear right wheel and the rear left wheel to operate.

3. The stroller according to claim 2, further comprising a differential, wherein the differential is connected to the power output shaft and the gear box, and the differential is operable to control the rotational speed outputted by the drive motor.

4. The stroller according to claim 1, wherein each of the right folding frame and the left folding frame comprises an upper front cross rod, a lower front cross rod, an upper rear cross rod, a lower rear cross rod, and a support frame, the support frame comprising an upper folding frame member, a lower folding frame member, and a central vertical rod connected between the upper folding frame member and the lower folding frame member, wherein a rear end of the upper front cross rod and a front end of the upper rear cross rod are pivotally connected to two ends of the upper folding frame member, respectively, and a rear end of the lower front cross rod and a front end of the lower rear cross rod are pivotally connected to two ends of the lower folding frame member, respectively, and front ends of the upper front cross rod and the lower front cross rod are pivotally connected to the front wheel frame, and rear ends of the upper rear cross rod and the lower rear cross rod are pivotally connected to the rear wheel frame; and a front connecting rod is connected between the lower front cross rods of the right folding frame and the left folding frame, and a rear connecting rod is connected between the lower rear cross rods of the right folding frame and the left folding frame.

5. The stroller according to claim 1, wherein the handrail comprises a base mounted thereon, and the base comprises at least one start button, a left turn button, a right turn button, and a control module, the at least one start button being disposed on a front side of the base, the left turn button and the right turn button being disposed on a side opposite to the at least one start button, the control module being disposed on an upper side of the base, a circuit board being embedded in the base, the circuit board being electrically connected with the drive controller and the battery unit.

6. The stroller according to claim 5, wherein the control module comprises a power button, a slow start acceleration button, a slow speed reduction button, and a reversing button; and the left turn button, the right turn button, the slow start acceleration button, the slow speed reduction button, and the reversing button are operable to control the drive motor to drive the stroller for forward movement, backward movement, and turning.

7. The stroller according to claim 1, further comprising a plurality of sensing elements, wherein the sensing elements are mounted on the rear wheel member, and the sensing elements are electrically connected with the drive controller and the battery unit; and the sensing elements comprise a weight sensing element, a temperature sensing element, a velocity sensing element, and an inertial measurement unit.

8. The stroller according to claim 1, wherein the at least one power control module comprises a left power control module and a right power control module, wherein the left power control module comprises a left drive motor, a left deceleration mechanism, and a left drive controller, one end of the left drive motor being connected with the left deceleration mechanism, another end of the left drive motor being connected with the left drive controller, the left deceleration mechanism being operable to drive the rear left wheel to operate; and the right power control module comprises a right drive motor, a right deceleration mechanism, and a right drive controller, one end of the right drive motor being connected with the right deceleration mechanism, another end of the right drive motor being connected with the right drive controller, the right deceleration mechanism being operable to drive the rear right wheel to operate.

9. The stroller according to claim 1, wherein the rear right wheel comprises a right inner frame, a right outer frame, and a right outer tire structure, and the rear left wheel comprises a left inner frame, a left outer frame, and a left outer tire structure, the right outer tire structure being combined with the right outer frame, the left outer tire structure being combined with the left outer frame, each of the right outer tire structure and the left outer tire structure comprising at least one tire unit, which is removable from the right outer frame or the left outer frame.

10. The stroller according to claim 1, wherein one of the guide grooves and one of the guide rails corresponding to and mating with the one of the guide grooves define mating configurations that are different from mating configurations of remaining ones of the guide grooves and ones of the guide rails corresponding to and mating with the remaining ones of the guide grooves to constrain the outer frame and the outer tire to mount to the motor cover in a specific direction.

11. The stroller according to claim 1, wherein a material of the outer frame comprises a nylon plastic material and a material of the outer tire comprises a polyurethane (PU) material.

* * * * *